(12) United States Patent
Maraviglia et al.

(10) Patent No.: US 8,605,349 B2
(45) Date of Patent: Dec. 10, 2013

(54) LARGE AREA SURVEILLANCE SCANNING OPTICAL SYSTEM

(75) Inventors: Carlos G. Maraviglia, Bethesda, MD (US); Michael Michelizzi, Fort Washington, MD (US); Kevin Cox, Pomfret, MD (US); Thomas Geiger, Huntingtown, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 295 days.

(21) Appl. No.: 13/238,635

(22) Filed: Sep. 21, 2011

(65) Prior Publication Data

US 2013/0070325 A1   Mar. 21, 2013

(51) Int. Cl.
*G02B 26/08* (2006.01)
*G01J 1/00* (2006.01)
*G01J 5/00* (2006.01)

(52) U.S. Cl.
USPC ............... 359/212.2; 250/336.1; 250/338.1

(58) Field of Classification Search
USPC ........ 359/212.2–215.1, 226.1, 364–366, 399, 359/727–731; 250/336.1, 338.1, 353
See application file for complete search history.

(56) References Cited

U.S. PATENT DOCUMENTS

| 4,087,689 A * | 5/1978 | Asawa ..................... 250/342 |
| 6,396,647 B1 * | 5/2002 | Chen ....................... 359/738 |
| 2006/0208193 A1 * | 9/2006 | Bodkin ..................... 250/353 |

* cited by examiner

*Primary Examiner* — James Phan
(74) *Attorney, Agent, or Firm* — US Naval Research Laboratory; L. George Legg

(57) ABSTRACT

An optical scanning system includes a frame having a central axis along which is mounted a first elevation mirror for receiving an incident light and reflecting the incident light along a first optical path, a telescope for receiving the reflected incident light and outputting an output light, a visible linear array imager for receiving the output light from the telescope, and a folding mirror positioned to receive part of the output light from the telescope and directing it to a linear array infrared imager. The optical scanning system scans large areas of sky using multiple linear sensors in order to detect, identify and track low and slow flying manned and unmanned aircraft as well as to surveil large areas of terrain.

8 Claims, 3 Drawing Sheets

LARGE AREA SURVEILLANCE SCANNING OPTICAL SYSTEM

FIELD OF THE INVENTION

The invention is directed to a scanning optical system, and more particularly to such a system employing multiple linear sensors and with the optical components configured in a vertically-mounted assembly.

BACKGROUND OF THE INVENTION

Currently the methods and machines used to surveil a large area using optical sensors normally use a large optic in a wide field of view and then switch to a narrow field of view for more detail. These systems use staring focal plane array sensors that experience image blur or sensitivity degradation when scanned across a scene or delays when using a step-stare scan pattern. Furthermore, the pixels are inspected by a human operator—this limits the system's accuracy due to operator fatigue and monitor limitations. The result of these drawbacks is that they are poor performers in detecting, identifying and tracking low and slow aircraft. If there is a computer component, it is usually used to assist an operator with inspecting a narrow or mosaic scene that is not tuned to these specific applications and lacks sensor sensitivity. Finally, the fusion of spectral bands to accomplish this mission is not being applied to this process in an automated manner

BRIEF SUMMARY OF THE INVENTION

According to the invention, an optical scanning system includes a frame having a central axis along which is mounted a first elevation mirror for receiving an incident light and reflecting the incident light along a first optical path, a telescope for receiving the reflected incident light and outputting an output light, a visible linear array imager for receiving the output light from the telescope, and a folding mirror positioned to receive part of the output light from the telescope and directing it to a linear array infrared imager.

The invention optically scans large areas of sky using multiple linear sensors in order to detect, identify and track low and slow flying manned and unmanned aircraft as well as to surveil large areas of terrain. The invention has a long range, covers multiple spectral bands, preferably employs long focal length optics to allow for greater resolution and advanced processing techniques to examine the sensor output using image processing techniques, and also preferably employs variable scan patterns to cover large sky and terrain sectors.

The advantages of this new system include the very large optics, the computer processed images, the adaptable and large scan areas/frames, and the ability to detect, identify and track small, low flying aircraft that are manned or unmanned. Furthermore, the system also detects human activity on the terrain and stores the imagery. Finally, another use of this system is to collect large area, high resolution imagery for other applications such as an EO/IR simulator program.

Due to the huge pixel count in the resultant scan, a significant feature of this system is that the images are processed to detect regions of interest by an image processing system using a GPU architecture. The area scanned can be varied to encompass large areas up to 360 degrees horizontally. The scan is done with different optically co-aligned sensors yielding a multispectral imaged scene. The image processor's algorithms then detect, identify and track the objects of interest using multiple techniques, including fused imagery. This has not been possible with other optical systems.

DETAILED DESCRIPTION OF THE INVENTION

Figure 1:
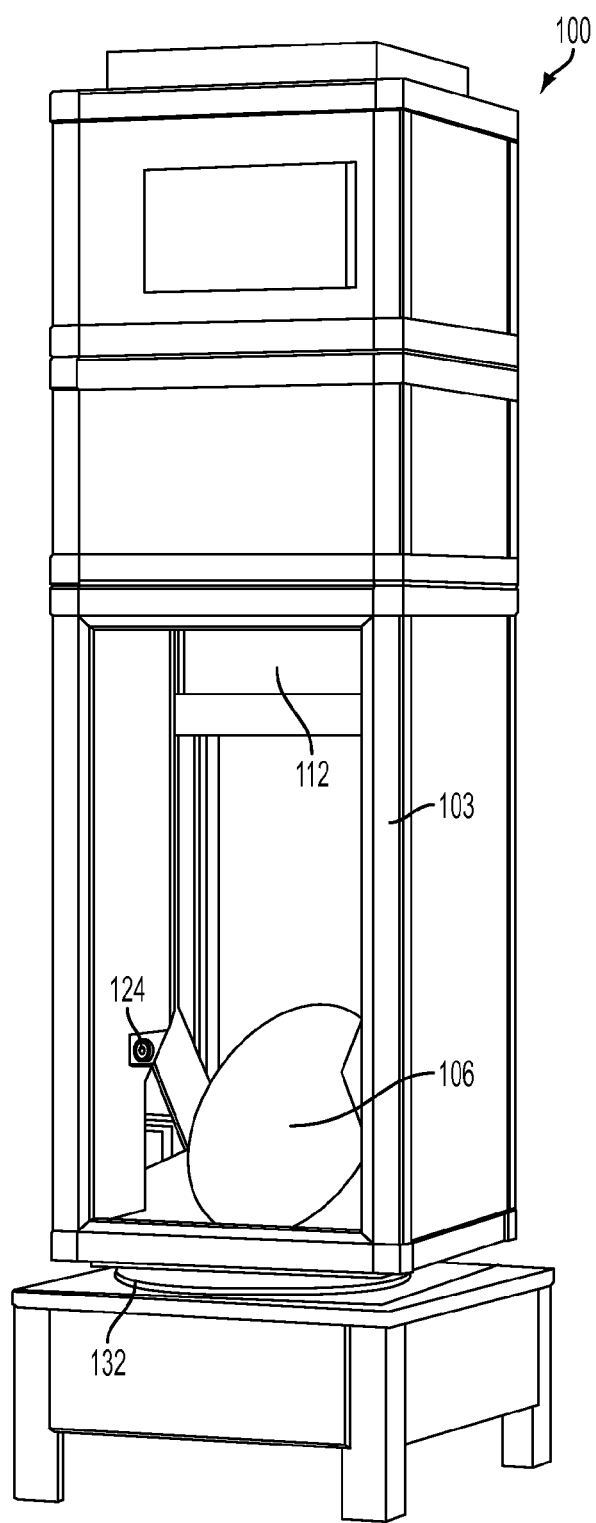
FIG. 1 is a perspective view of a scanning optical system according to the invention.
Figure 2:
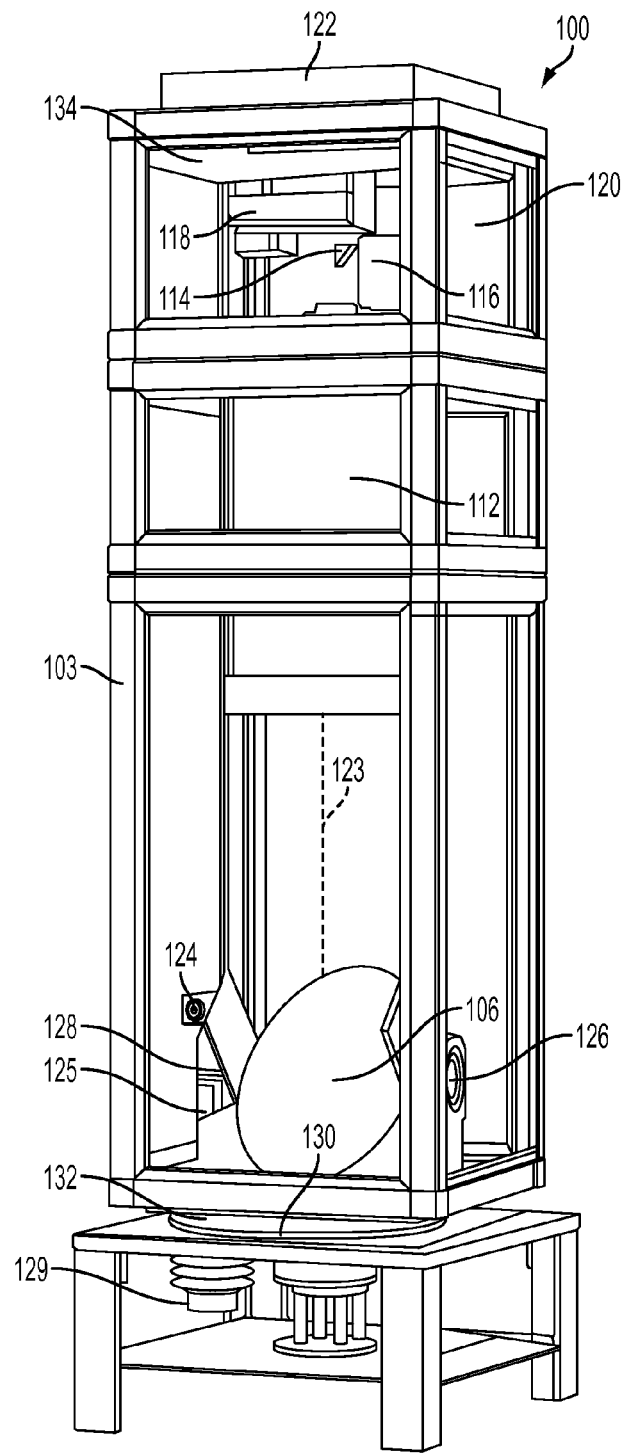
FIG. 2 is an isometric view of the interior components of the system of FIG. 1.
Figure 3:
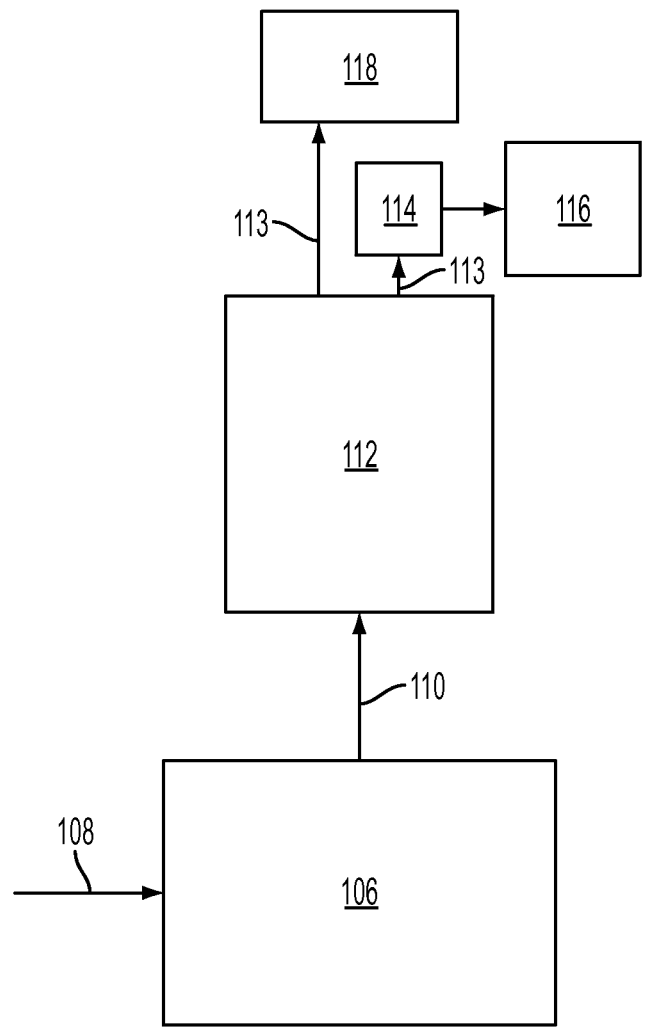
FIG. 3 is a schematic diagram showing the optical paths within the scanning optical system according to the invention.

Referring now to FIGS. 1-3, an optical scanning system 100 includes an aluminum frame 103 containing a first elevation mirror 106 for directing an incident light 108 along a first optical path 110 into a telescope 112, e.g. a Schmidt-Cassegrain telescope. The output light 113 from telescope 112 is directed to a folding mirror 114 that directs part of output light 113 to a linear array infrared imager 116 while the rest of light 113 passes directly to a visible linear array imager 118.

The elevation mirror 106 is preferably a first surface reflector with a protected aluminum coating. This mirror is mounted to a structure that also holds a dual-axis gyro 120 used for rate stabilization. The telescope 112 is preferably a 2300 mm focal length optical tube assembly with roughly a 1.5 degree field of view in elevation. In order to minimize loss, folding mirror 114 is preferably gold coated. Because neither imager 116 or 118 is directly coupled to the telescope, the entire frame 120 in which they and the mirrors are housed is sealed off from outside ambient light.

System 100's unique mechanical design includes the composition of the optical/gimbal assembly 122. The optical path comprises the mirror 106 to adjust elevation angle and steer the light up into the Schmidt-Cassegrain telescope 112, the gold coated folding mirror 114 to steer a portion of the output light 113 from the telescope to the infrared sensor 116, a visible linear array imager 118 and a SWIR (short-wave infrared) linear array imager 116.

For effective surveillance, system 100 should have a wide horizontal field of view. This is achieved by rotating the lower mirror 106, telescope 112, optical elements 114, 116, and 118 along with frame 103 and all other supporting components in unison about an axis 123 passing through the center points of these vertically stacked components. Scanning in this way is necessary to keep the overall size and power as low as possible, as it reduces the moment of inertia about the scanning axis. This vertical orientation also offers a more aerodynamic drag profile so as not to be impacted in windy conditions and allows for a smaller azimuth motor drive.

System movement is controlled by a digital control loop running brushed DC motors and receiving feedback from optical absolute position encoders 128, 129 and a dual-axis gyro 124. Elevation (vertical) positioning involves rotating the elevation mirror 106 and gives a view from 10 degrees below to about 45 degrees above horizontal. Azimuth (horizontal) positioning involves rotating the connected lower (elevation) mirror 106, telescope 112, and optical elements in unison as described above and gives a full 360 degree range of movement.

The gyro 124 is mounted on the bracket for the elevation mirror 106 in order to pick up rotation in both axes. The elevation motor 126 is housed inside the gimbal 125 and directly drives the mirror 106 so there is no chance of backlash or latency. The other side of the gimbal 125 houses a first, elevation position encoder 128. The azimuth motor 130 is mounted inside the hub 132 at the bottom of the frame 103 and is also a direct drive configuration. A second position encoder 129 is coupled to the azimuth hub 132 to provide position feedback to the control software.

In the case of the system being used on a moving platform (e.g. on a ship, raised on a tower, etc.) there can be a third degree of motion built in to the imager to correct for any roll (not pictured). The imagers would be mounted such that they can be rotated independently from the elevation mirror so that the imagers are always oriented vertically with respect to the horizon. This stage would be driven by a small motor mounted in the optical frame 134 with the imagers along with a third position encoder and a single axis gyro to provide feedback.

Electrical/Software Design

Processing—Gimbal control

The aluminum frame 103 and gimbal 125 are inertially stabilized in azimuth, elevation and roll electronically. This is accomplished by mounting gyros on the mirror 106 bracket for azimuth and elevation and roll correction stage for roll. The system also preferably includes an Inertial Reference unit (IRU) monitoring the whole platform's attitude in the three axis for roll correction. All of these sensor inputs are fed into a small processor that implements a closed loop stabilization routine and feedback correction signals to the motors on the gimbal and roll stage. These correction signals in this feedback loop do two things: cancel out unwanted motions from moving platforms such as moving vehicles, ships or swaying towers; provide an accurate rate for an azimuth scan as detailed in the section above. The processor for this closed loop system is preferably mounted in a detached enclosure.

Processing—Image Processing Architecture

The analysis of the large area scan is accomplished through the image processing of the high resolution outputs of two state of the art Commercial Off-The-Shelf (COTS) line scanning imagers, one in the visible and one in the near infrared (NIR) band. Image collection and processing at these high data rates is technically complex. The detection, identification and tracking of small objects in cluttered and non cluttered environments on high resolution imagery in real-time requires adaptive, massively parallel software algorithms. Many factors in the environment such as scene clutter, light conditions, and target geometry can affect the success of one algorithm over another. To provide the greatest flexibility in algorithm choice, the system is configured with a core set of software tools to control baseline functionally. The processing is achieved by spreading the computational load over one or more Graphical Processor Units (GPU). Core functionality includes image collection/recording/display, gimbal control, and imager control.

While the present invention has been described with respect to exemplary embodiments thereof, it will be understood by those of ordinary skill in the art that variations and modifications can be effected within the scope and spirit of the invention.

What is claimed as new and desired to be protected by Letters Patent of the United States is:

1. An optical scanning system comprising:
   a frame having a central axis along which is mounted:
   a first elevation mirror for receiving an incident light and reflecting the incident light along a first optical path;
   a telescope for receiving the reflected incident light and outputting an output light;
   a visible linear array imager for receiving the output light from the telescope;
   and a folding mirror positioned to receive part of the output light from the telescope and directing it to a linear array infrared imager.

2. The optical scanning system of claim 1, wherein the frame is aluminum.

3. The optical scanning system of claim 1, wherein the first elevation mirror has a reflector surface with a protected aluminum coating thereon.

4. The optical scanning system of claim 1, wherein the folding mirror has a gold reflective surface coating.

5. The optical scanning system of claim 1, wherein the frame is sealed off from ambient light.

6. The optical scanning system of claim 1, further comprising a rotating means for rotating the first elevation mirror, the telescope, the folding mirror, the visible linear array imager, and the infrared linear array imager in unison about the central axis.

7. The optical scanning system of claim 6, wherein the rotating means includes at least one position encoder.

8. The optical scanning system of claim 7, wherein the at least one position encoder includes a first position encoder that is an elevation position encoder and a second position encoder coupled to an azimuth hub to provide position feedback to control software.

* * * * *